(12) United States Patent
Bowie

(10) Patent No.: US 9,297,716 B2
(45) Date of Patent: Mar. 29, 2016

(54) PIPE END SEALING TOOL

(75) Inventor: Angus George Bowie, Scotland (GB)

(73) Assignee: Stats (UK) Limited, Aberdeen, Scotland (GB)

( * ) Notice: Subject to any disclaimer, the term of this patent is extended or adjusted under 35 U.S.C. 154(b) by 807 days.

(21) Appl. No.: 12/627,240

(22) Filed: Nov. 30, 2009

(65) Prior Publication Data

US 2011/0126933 A1     Jun. 2, 2011

(51) Int. Cl.
| | |
|---|---|
| *F16L 55/11* | (2006.01) |
| *G01M 3/02* | (2006.01) |
| *F16L 55/115* | (2006.01) |
| *F16L 55/128* | (2006.01) |
| *F16L 55/132* | (2006.01) |

(52) U.S. Cl.
CPC ............ *G01M 3/022* (2013.01); *F16L 55/1157* (2013.01); *F16L 55/1286* (2013.01); *F16L 55/132* (2013.01)

(58) Field of Classification Search
CPC .... F16L 55/10; F16L 55/1125; F16L 55/1155
USPC ..................................... 138/89, 90
See application file for complete search history.

(56) References Cited

U.S. PATENT DOCUMENTS

| | | | | | |
|---|---|---|---|---|---|
| 2,886,067 | A | * | 5/1959 | Maxwell et al. | 138/90 |
| 3,326,243 | A | * | 6/1967 | Augustus | 138/90 |
| 3,638,969 | A | * | 2/1972 | Serrano | 285/18 |
| 3,709,260 | A | * | 1/1973 | Windle | 138/90 |
| 3,748,702 | A | * | 7/1973 | Brown | 188/67 |
| 3,765,560 | A | * | 10/1973 | Kemp | 138/90 |
| 3,844,313 | A | * | 10/1974 | Arnold | 138/90 |
| 4,077,250 | A | * | 3/1978 | Wesch | 73/49.8 |
| 6,499,511 | B2 | * | 12/2002 | Brewis | 138/89 |

FOREIGN PATENT DOCUMENTS

GB     2448036 A     10/2008

OTHER PUBLICATIONS

European Search Report for EP Application No. 10252025 dated Oct. 4, 2012.

* cited by examiner

*Primary Examiner* — James Hook
(74) *Attorney, Agent, or Firm* — Carlson, Gaskey & Olds, P.C.

(57) ABSTRACT

A pipe end-sealing tool includes a body. A seal is mounted on the body and is adapted to apply a sealing pressure to an inner wall of a pipe end to be sealed. A lock is also mounted on the body and is adapted to engage an outer wall of the pipe end. Thus, a load applied to the pipe wall by the lock opposes the sealing pressure.

20 Claims, 2 Drawing Sheets

PIPE END SEALING TOOL

TECHNICAL FIELD

This invention relates to a pipe end sealing tool, such as a pipe end plug. The tool may be utilized to seal the end of a pipe or tube to permit, for example, the pressure integrity of the pipe to be tested.

BACKGROUND OF THE INVENTION

In many industries, there is a requirement to pressure test pipes, tubes, pipe modules, pipelines and the like. For example, in the oil and gas industry, some process plant is assembled from modules, which are welded together on site. The pipe weldments in these modules must be pressure tested prior to shipping to site. The first step in the pressure testing process is the sealing of the open end of the tubing. At present, this is achieved by one of welding a cap on to the tubing, inserting an isolation plug into the end of the tubing, or by sliding a mechanical cap over the end of the tubing.

Welding a cap on to the tubing is expensive and time consuming. Furthermore, once the test is complete, the cap must be cut off.

The use of an internal isolation plug requires provision of a plug with a locking mechanism and seal. This requires a straight length of pipe to accommodate the plug, and thus may require a straight spool to be welded to the pipe to accommodate the plug. Furthermore, steel pipe tends to be supplied in standard outside diameters, but internal diameters may vary. Accordingly, internal plugs must be dressed or sized to suit the particular internal diameter of the tubing under test. This is particularly important for the plug locking mechanism, where an incorrect sizing selection may reduce the ability of the plug to resist the test pressure load, which load will tend to eject the plug from the tubing if not resisted. In the case of self-energized plugs in which the test pressure energizes the plug sealing and lock mechanisms, the loads generated by the test pressure are transferred to the tubing, causing peak hoop stress at the seal and lock contacts. Accordingly, the tube end must be assessed for each application, to ensure that the tubing wall will accommodate the anticipated hoop stress.

The use of externally mounted mechanical caps removes the dressing requirement for each tubing bore, as pipe is normally specified by outside diameter, but as the cap seals engage the outer wall surface of the tubing, and thus encompass a larger area, the ejection load experienced by a cap is greater than that experienced by a corresponding plug. Caps also tend to be heavier and require even longer lengths of straight pipe than a corresponding plug. Furthermore, the cap locks and seals create localised stresses on the tubing wall, such that the tubing wall condition must always be carefully assessed.

SUMMARY OF THE INVENTION

A pipe end sealing tool includes a body, a seal mounted on the body and adapted to apply a radial sealing pressure to a wall of a pipe end to be sealed, and a lock mounted on the body and adapted to engage a wall of the pipe end. A radial load applied to the pipe wall by the lock is adapted to support the opposing sealing pressure.

According to another aspect of the present invention, a method of sealing an end of a pipe includes the steps of providing a tool comprising a seal and a lock, both mounted on a tool body, locating the seal on the end of a pipe, engaging a wall surface of the pipe end with the lock, and applying a radial sealing pressure to a wall surface of the pipe end with the seal. A radial load applied to the pipe wall by the lock supports the opposing sealing pressure.

Thus, the load applied to the pipe outer diameter by the lock is supported by the seal pressure, and vice versa. This avoids the problems experienced with conventional internal plugs and conventional externally-mounted caps, in which the sealing pressure and lock loads act in a common direction, placing potentially large unbalanced loads on the pipe wall. Also, the separation of the sealing and locking arrangements facilitates provision of a more compact arrangement, and embodiments of the invention have been produced which are approximately half the length of a conventional plug or cap.

The seal may take any appropriate form, and in one embodiment the seal comprises a compression seal. Radial movement of a sealing surface of the seal and a sealing pressure may be produced by axial compression of the seal. The seal may comprise an elastomeric seal element. In one embodiment, an annular seal element is provided on a mandrel or core between opposing compression faces, the faces being relatively movable to compress the element and induce radial expansion of the element.

The seal may be self-energized. Once a minimum pressure differential is achieved across the seal, the internal pipe pressure will tend to maintain the seal in the energized configuration, independently of the status of the seal actuation system, such that the seal is fail-safe.

The lock may take any appropriate form. Lock members may be provided and be adapted to be selectively urged into engagement with the wall of the pipe. The lock may comprise a taper lock. A lock member may comprise an inclined surface and be operatively associated with a relatively movable cooperating member with a corresponding inclined surface. The lock member may feature teeth or some other surface configuration for gripping the pipe wall surface.

The lock may be configured such that an ejection load on the tool serves to increase the grip of the lock on the pipe wall surface, that is, the lock may be self-energized. The ejection load path through the tool may be arranged to bypass the lock actuation system. This may facilitate avoiding overloading of the system and ensure that the self-energising feature is effective in the event of an actuating system failure.

The seal and lock may be actuated separately, or may be actuated by a common actuation system or arrangement. The seal and lock may be actuated by any appropriate mechanism, for example by bolts, torque, or by induction. In one embodiment, one or both of the seal and lock are fluid actuated, and may be hydraulically actuated, although pneumatic actuation may also be utilized.

The lock may be energized or actuated prior to energising or actuating the seal, ensuring that the tool is locked to the pipe end before pressure is applied across the tool.

The tool may feature a fill/vent port, and this port may extend through a tool core. Where the tool is intended to be utilized in horizontal applications, the port may be configured, for example by provision of an internal elbow, to provide a high point vent.

The tool may comprise a dual seal feature, whereby a volume between two seals can be pressurized and monitored to allow the integrity of the seal to be verified before pressurizing the pipe.

Further aspects of the invention are described below. These aspects may be provided in combination with selected ones of the various individual features of the aspects of the invention described above.

According to a further aspect of the present invention, a pipe end sealing tool includes a body configured for mounting on an end of a pipe, a seal mounted on the body, the seal being configurable to engage one of an inner face and an outer face of a pipe wall, and a lock mounted on the body, the lock being configurable to engage the other of the inner face and the outer face of the pipe wall, the tool being configured such that, in use, the lock extends further axially onto the pipe than the seal.

According to another aspect of the present invention, a pipe end sealing method includes the steps of locating a pipe end sealing tool including a lock and a seal on a pipe end, engaging the lock with one of an inner face and an outer face of the pipe end wall at a first axial distance from the pipe end, and engaging the seal with the other of the inner face and the outer face of the pipe wall at a second axial distance from the pipe end, the second axial distance being less than the first axial distance.

The relative location of the lock and seal provide a safeguard in the event of test pressure applied to the pipe displacing the tool from the end of the pipe. In one embodiment, if the forces retaining the tool on the pipe end are insufficient to resist the fluid pressure ejection forces, the body carrying the seal and the lock will be pushed from the end of the pipe. However, given the relative axial locations of the seal and lock, the seal will be moved beyond the end of the pipe before the lock. The resulting loss of sealing and drop in internal pipe pressure, and thus removal of the ejection force, occurs while the lock remains engaged with the pipe wall. The tool is therefore unlikely to be ejected from the pipe end.

Sections of the seal and lock may overlap, however an inboard part of the lock will extend further onto the pipe than the seal, at least while the seal is in a sealing configuration.

The seal may be configured to engage the inner wall of the pipe and the lock may be configured to engage the outer wall of the pipe.

According to a still further aspect of the present invention, a pipe end test tool includes a body configured for mounting on a pipe end, and a lock arrangement comprising a lock element located between first and second members configured to be urged to move in opposite directions to actuate the lock element to engage the pipe wall, the first member being configured to bear axially on the pipe end.

According to a yet further aspect of the present invention, a pipe end sealing method includes the steps of locating a pipe end test tool on a pipe end, and actuating a pipe wall-engaging lock element located between first and second members by urging the members in opposite directions with the first member bearing axially on the pipe end.

This arrangement facilitates the correct location of the lock element on the pipe end. On actuation of the lock assembly the first member will tend to be urged against the pipe end and thus serve to locate the lock arrangement relative to the pipe end.

The lock element may be a taper lock. The second member may include a bearing face for cooperating with the element and urging the element radially into engagement with the pipe wall.

According to an alternative aspect of the present invention, a pipe end test tool includes a body configured for mounting on a pipe end and a lock assembly including a taper lock element and a lock actuating member having a bearing face for urging the element into engagement with the pipe wall, the lock assembly being configured for actuation by radial movement of the element relative to the pipe and axial movement of the member relative to the pipe.

According to an additional aspect of the present invention, a pipe testing method includes the steps of mounting a pipe end test tool on a pipe end, and translating a taper lock element solely radially to engage the pipe wall by translating a lock actuating member axially relative to the pipe.

Such an arrangement may facilitate setting and release of the lock element when compared to other arrangements in which the taper lock element is translated axially when being set and released.

According to an aspect of the invention, a pipe end test tool includes a body configured for mounting on a pipe end, and a lock assembly including a lock element located between first and second lock actuating members, an actuating arrangement operable to move the members to actuate the element to engage the pipe, and a retraction arrangement operable to move the members to disengage the element from the pipe.

According to an alternative aspect of the invention, a pipe testing method includes the steps of mounting a pipe testing tool on a pipe end, engaging the pipe wall with a lock element located between first and second members by actuating a first relative movement of the members, and retracting the lock element from the pipe wall by actuating a second relative movement of the members.

The lock element may be a taper lock.

One or both of the actuating arrangement and the retraction arrangement may comprise a chamber configured to receive pressurized fluid.

BRIEF DESCRIPTION OF THE DRAWINGS

These and other aspects of the invention will now be described, by way of example, with reference to the accompanying drawings, in which.

DETAILED DESCRIPTION OF THE DRAWING

Figure 1:
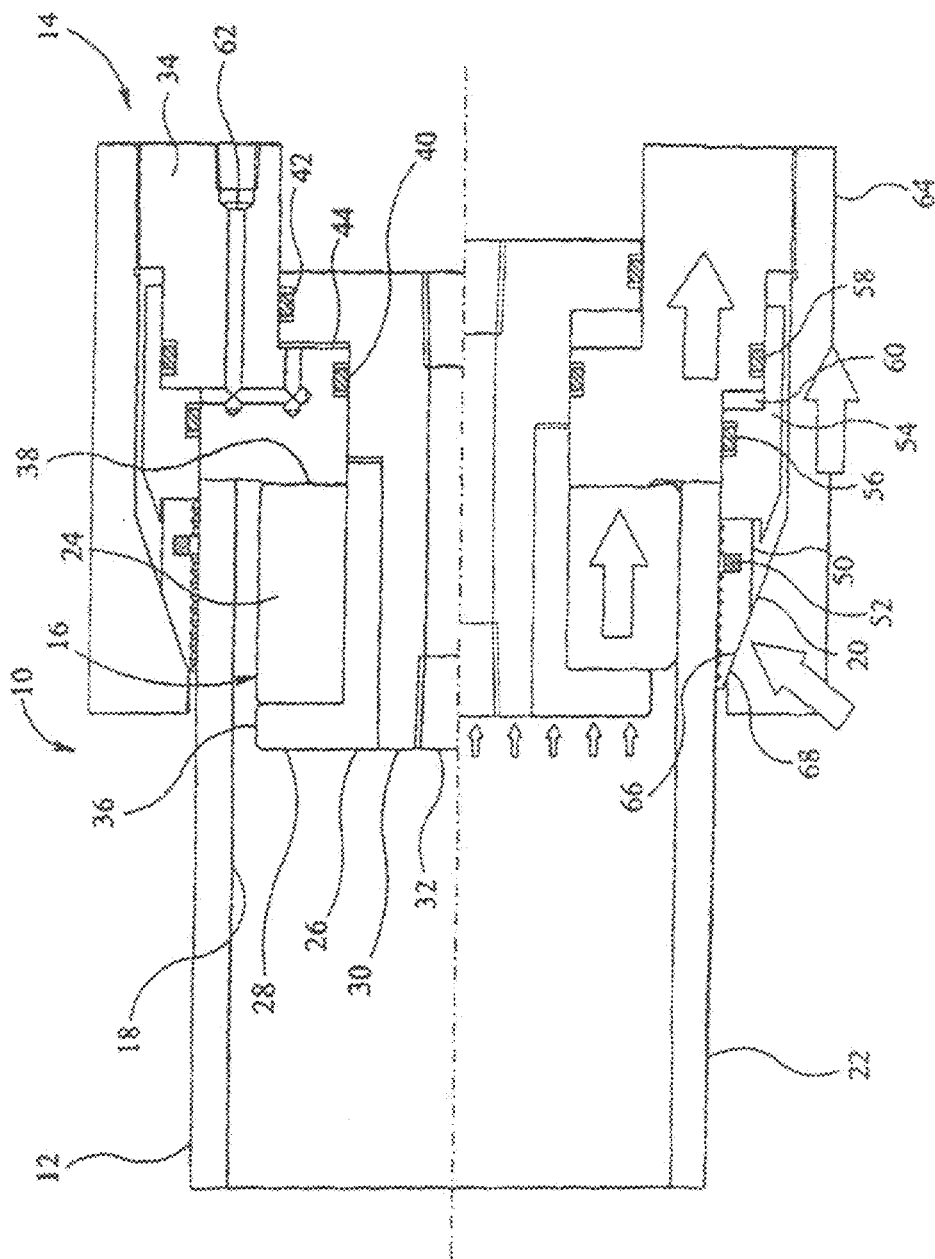
FIGS. 1 and 2 are sectional views of pipe end sealing tools in accordance with first and second embodiments of the present invention, the top half of each figure illustrating the respective tool in a fitting and retrieval configuration, and the lower half of each figure illustrating the tool in an energized configuration.

FIG. 1 of the drawings illustrates a pipe end sealing tool 10 in accordance with a first embodiment of the present invention. The figure shows the tool 10 in section, the upper half of the figure illustrating the tool 10 in a fitting and retrieval configuration, while the lower half of the figure illustrates the tool 10 in an activated or energized configuration. The tool 10 may be utilized to close and seal the end of any appropriate pipe or tube, and is ideally suited for use in testing prefabricated pipe spools and the like, as used in the oil and gas industry. The tool is shown mounted on the end of a length of plain pipe 12, in this example the pipe being the end of a pipe spool.

The tool 10 comprises a body 14 providing mounting for a compression seal 16, adapted to engage the inner pipe wall 18, and a taper lock 20, adapted to engage the outer pipe wall 22.

The compression seal 16 comprises an annular rubber seal element 24. Mounting for the element 24 is provided by a mandrel or core 26. The core 26 is in two parts, the element 24 being mounted on a flanged sleeve 28 which is threaded to a carrier 30. A fill/vent port 32 extends through the carrier 30, to allow the interior of the pipe to be pressurized and vented.

While the inner end face and inner diameter of the element 24 are contained by the flanged sleeve 28 mounted on the carrier 30, the outer end face of the element 24 is contained by a face of a ported body member 34. A carrier flange 36 and a body member flange 38 engage the end faces of the element 24. The carrier 30 and the body member 34 are provided with co-operating seals 40, 42, and together define a chamber 44 into which pressure may be introduced such that the carrier 30 acts as a piston to move the core 26 outwards relative to the body member 34 and the pipe end, to axially compress and radially expand the seal element 24.

The taper lock 20 comprises lock members or segments 50 adapted to engage the outer pipe wall 22. In an initial fitting and retrieval configuration, the teeth on the inner surface of the lock segments 50 are lifted clear of the pipe wall 22 by sprung pins 52, to facilitate fitting and removal of the tool 10 from the pipe end. The end face of each lock segment 50 engages a piston sleeve 54, which co-operates with stepped outer faces of the body member 34. Seals 56, 58 create a chamber 60 to which pressurized hydraulic fluid may be supplied via body member ports 62, to move the piston sleeve 54 and lock segments 50 relative to the body member 34.

An outer sleeve or casing 64 is threaded to the body member 34 and features a taper face 66 for co-operating with corresponding lock segment taper faces 68. Thus, when pressurized hydraulic fluid is introduced to the chamber 60, relative movement between the taper faces 66, 68 urges the lock segments 50 into locking contact with the outer pipe wall 22.

In use, the tool 10 is located on the end of a pipe 12 to be pressure tested. The pipe wall is accommodated in the annular volume between the seal element 24 and the lock segments 50. Steel pipe is supplied in standard outside diameters, such that the components adapted to co-operate with the outer pipe wall 22 may be sized with a degree of accuracy and confidence. However, variations in pipe wall thickness and configuration, which give rise to less predictable inner pipe wall dimensions, are relatively easily accommodated by the clearance provided by the non-energized seal element 24.

To actuate or energize the tool 10, a source of pressurized hydraulic fluid is coupled to the body member ports 62, and pressurized fluid supplied to fill the chambers 44, 60, as shown in the lower half of the figure. The actuation arrangement is configured such that the lock segments 50 will be energized to grip the outer pipe wall 22 before the seal element 24 is fully energized, and comes in to contact with the inner pipe wall 18. This ensures that the lock arrangement 20 is actuated prior to the generation of a seal, ensuring that the tool 10 is securely locked on the pipe end 12 before any pressure can be applied across the tool 10.

It will be noted that the actuated lock segments 50 and the energized seal element 24 are positioned on opposing sides of the pipe wall. Accordingly, the loads applied to the pipe wall by the lock members 50 and the seal element 24 are balanced, the pressure forces created by the energized seal element 24 being supported by the energized lock members 50, and vice versa.

Once activated, the load path of the internal test pressure applied within the pipe self-energizes the tool 10, such that the isolation will be maintained, independently of the integrity of the actuation system. In particular, the internal test pressure which acts on the tool core 26 generates a force on the compression seal related to the test pressure times the ratio of the pipe bore cross sectional area divided by the seal element cross sectional area. This load generates a rubber pressure in the seal element 24 which is higher than the pressure being isolated.

Furthermore, the ejection load path through the tool 10 passes through the body member 34 and the outer casing 64 to press lock segment taper faces 68, so increasing the grip of the lock 20. This load path bypasses the hydraulic actuation system, to both prevent over pressurizing the system and to ensure that the loss of the actuation system would not affect the self-energisation feature.

Those of skill in the art will recognise that the above described pipe end sealing tool 10 provides a quick and reliable method of temporarily capping open pipes and tubes. The relative locations of the seal 16 and lock 20 allow the tool 10 to be relatively compact, typically half the length of a conventional mechanical plug or mechanical cap. Furthermore, the relative locations of the seal 16 and lock 20 allow the internal seal and external locking loads to offset or balance, such that the pipe wall does not experience significant radial stresses. Furthermore, the tool 10 may be actuated quickly and easily using hydraulic fluid, but once differential pressure is applied across the tool, both the seal 16 and the lock 20 are self-energized.

Tools made in accordance with embodiments of the invention, such as the tool 10 described above, are capable of isolating pressures in excess of 350 bar.

Figure 2:
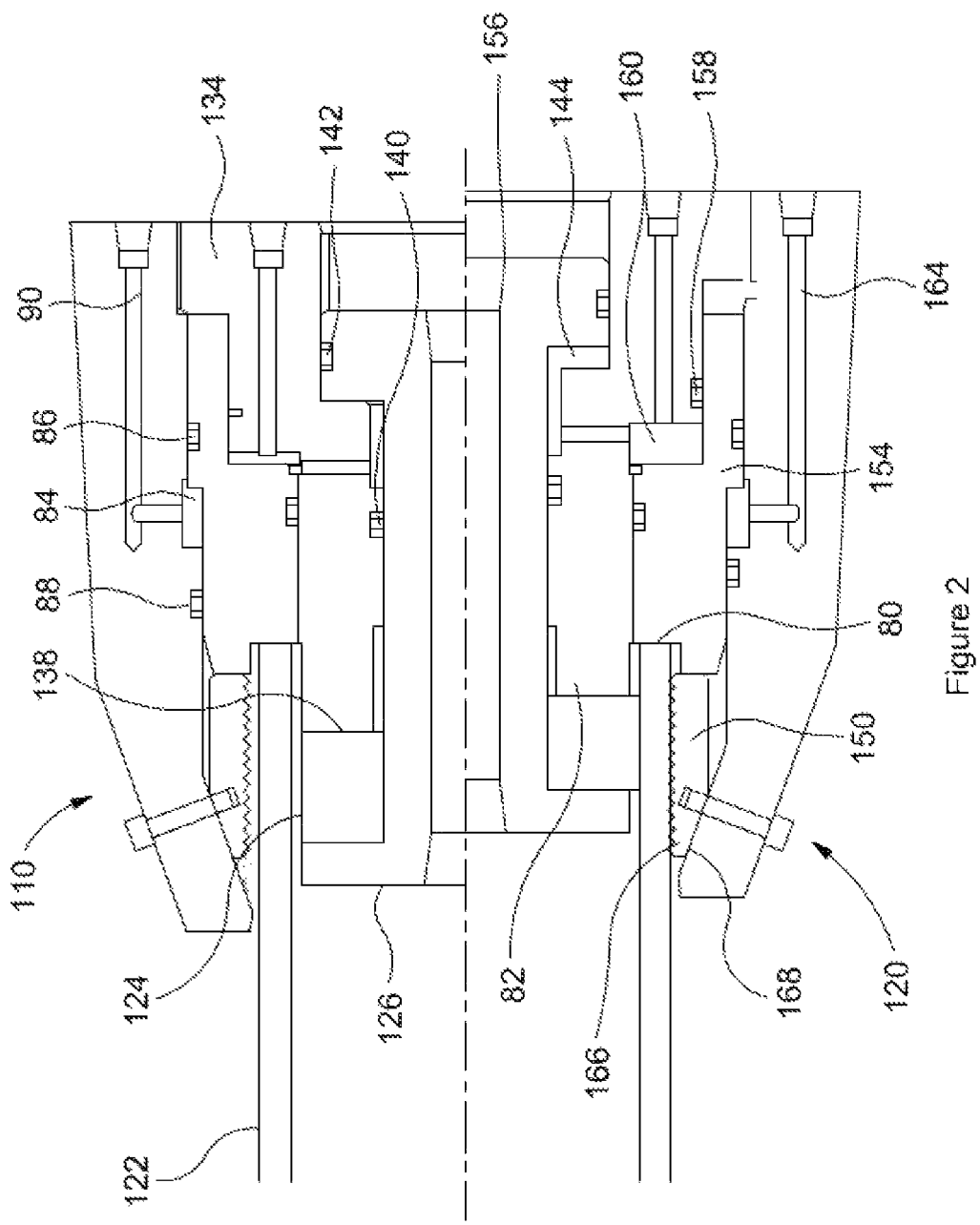

Reference is now made to FIG. 2 of the drawings, which illustrates a pipe end sealing tool 110 in accordance with a further embodiment of the present invention. As with FIG. 1, the tool 110 is shown in section, the upper half of the drawing illustrating the tool 110 in a fitting and retrieval configuration, while the lower half of the drawing illustrates the tool 110 in an actuated or energized configuration. The tool 110 is shown mounted on the end of a length of plain pipe 112.

Many elements of the features and operation of the tool 110 are similar to the tool 10 described in detail above. Accordingly, in the interest of brevity, certain common features and operational aspects of the tools 10, 110 will not be described in any detail.

The ported body member 134 is rigidly coupled to the outer sleeve or lock bowl 164 and is further rigidly coupled to an inner sleeve 82 which is configured to extend into the pipe end and provides mounting for the core 126 and also defines a flange or face 138 for abutting an end of the seal element 124.

The piston sleeve 154 engages the end of the taper lock segments 150 but in this embodiment is configured to abut and react against the pipe end face 80.

To lock and seal the tool 110 on the pipe end, pressurized fluid is supplied via passages in the body member 134 to the inner and outer chambers 144 and 160. The inner chamber 144 is formed between seals 140, 142 on the core 126 and the inner sleeve 82. The outer chamber 160 is formed between seals 156, 158 on the piston 154 and body member 134.

The relative axial movement between the core 126 and the inner sleeve and ported body member assembly 82, 134 associated with the expansion of the inner chamber 144 causes axial compression and radial expansion of the seal element 124.

The relative axial movement between the piston sleeve 154 and the body member 134, associated with the expansion of the outer chamber 160, urges the piston 154 against the pipe end face 80 while urging the lock bowl 164, which is coupled to the body member 134, in the opposite direction. Thus, the taper lock segments 150 are urged radially inwards by the interaction between the inclined faces 166, 168 to engage the outer face of the pipe wall 122. Also, the reaction of the piston 154 against the pipe end face 80 facilitates the correct location of the tool 110 on the pipe end 122.

In contrast to the tool 10 described above, the segments 150 move substantially solely radially inwards to engage the pipe wall, and similarly the segment 150 move substantially radially outwards when the tool 110 is unlocked. This facilitates setting and release of the taper lock arrangement 120.

Retraction of the segments 150 and release of the lock 120 is further facilitated by the provision of an additional chamber 84 between seals 86, 88 on the piston 154 and the lock bowl 164. Supplying pressurized fluid to the chamber 84, via passages 90 in the lock bowl 164, causes axial separation of the piston 154 and the lock bowl 164, which has the effect of translating the lock bowl 164 along the pipe, allowing the lock segments 150 to move radially outwards.

In this tool 110 it will be noted that the set taper lock segments 150 extend further along the pipe than the set seal element 124. The relative location of the lock segments 150 and the seal element 124 provides a safeguard in the event of the lock 120 providing inadequate grip and being unable to prevent test pressure applied to the pipe displacing the tool 110 along the pipe 122. In this situation, the tool 110 may be pushed off the end of the pipe 122. However, given the relative axial locations of the seal element 124 and lock segments 150, the seal element 124 will be moved beyond the end of the pipe 122 before the lock segments 150. The resulting loss of sealing and drop in internal pipe pressure, and removal of the ejection load, occurs while the lock segments 150 remain engaged with pipe wall. The tool 110 is therefore unlikely to be ejected from the pipe end 122.

This feature of the tool 110 obviates the requirement to provide an additional clamp for retaining the tool 110 relative to the pipe 122; the additional radial support for the pipe 122 provided by such clamps may invalidate testing that has been carried out on the pipe section.

Those of skill in the art will appreciate that the above described tools 10, 110 are merely exemplary of the present invention, and that various modifications and improvements may be made thereto without departing from the scope of the invention. For example, many of the advantages of the invention may be achieved in a tool in which a seal is mounted externally on a pipe, and a lock is provided internally.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A pipe end test tool comprising:
a body configured for mounting on an end of a pipe; and
a lock arrangement comprising a taper lock element for gripping the pipe, the lock element located between a first member and a second member configured to be urged to move in opposite first and second directions to actuate the lock element to engage a wall of the pipe,
wherein the first member is configured to be urged in the first direction to bear axially on the end of the pipe, and the second member is configured to be moved in the second direction, the second member comprising an inclined face for cooperating with the lock element to move the lock element radially and urging the lock element into engagement with the pipe on axial movement of the second member in the second direction.

2. The tool of claim 1, comprising a seal mountable on the body and adapted to apply a radial sealing pressure to a wall of the end of the pipe.

3. The tool of claim 2, wherein a radial load applied to the wall of the pipe by the lock element is adapted to oppose the sealing pressure.

4. The tool of claim 2, wherein sections of the seal and the lock element are configured to be the same axial distance from the end of the pipe.

5. The tool of claim 2, wherein the seal is configured to be self-energized.

6. The tool of claim 1, wherein the lock element is configurable to engage one of an inner face and an outer face of the wall of the pipe at a first axial distance from the end of the pipe and a seal is mounted on the body, the seal being configurable to engage the other of the inner face and the outer face of the wall of the pipe at a second axial distance from the end of the pipe, the tool being configured such that, in use, the first axial distance is greater than the second axial distance.

7. The tool of claim 6, wherein a radial load applied to the wall of the pipe by the lock element is adapted to oppose the sealing pressure.

8. The tool of claim 6, wherein sections of the seal and the lock element are configured to be the same axial distance from the end of the pipe.

9. The tool of claim 6, wherein the seal is configured to be self-energised.

10. The tool of claim 1, comprising an actuation arrangement operable to move the first and second members to actuate the lock element to engage the pipe, and a retraction arrangement operable to move the members to disengage the lock element from the pipe.

11. The tool of 10, wherein the actuation arrangement includes a chamber configured to receive pressurized fluid.

12. The tool of claim 11, wherein the chamber of the actuation arrangement is configured to receive pressurized fluid to move the second member in the second direction.

13. The tool of claim 10, wherein the retraction arrangement is separate from the actuating arrangement.

14. The tool of claim 10, wherein the retraction arrangement includes a chamber configured to receive pressurized fluid to move the second member in the first direction.

15. The tool of claim 1, wherein the lock arrangement is configured for setting by axial movement of the second member relative to the pipe, and substantially solely radial movement of the lock element relative to the pipe.

16. The tool of claim 1, wherein the first member comprises a piston sleeve.

17. The tool of claim 1, wherein the second member comprises a lock bowl.

18. The tool of claim 1, wherein the lock element extends further axially into the pipe in both unset and set configurations.

19. The tool of claim 1, wherein the first member is configured to engage an end of the lock element.

20. The tool of claim 1, wherein the lock element is axially secured to the lock actuation member.

* * * * *